United States Patent Office 3,071,390
Patented Jan. 1, 1963

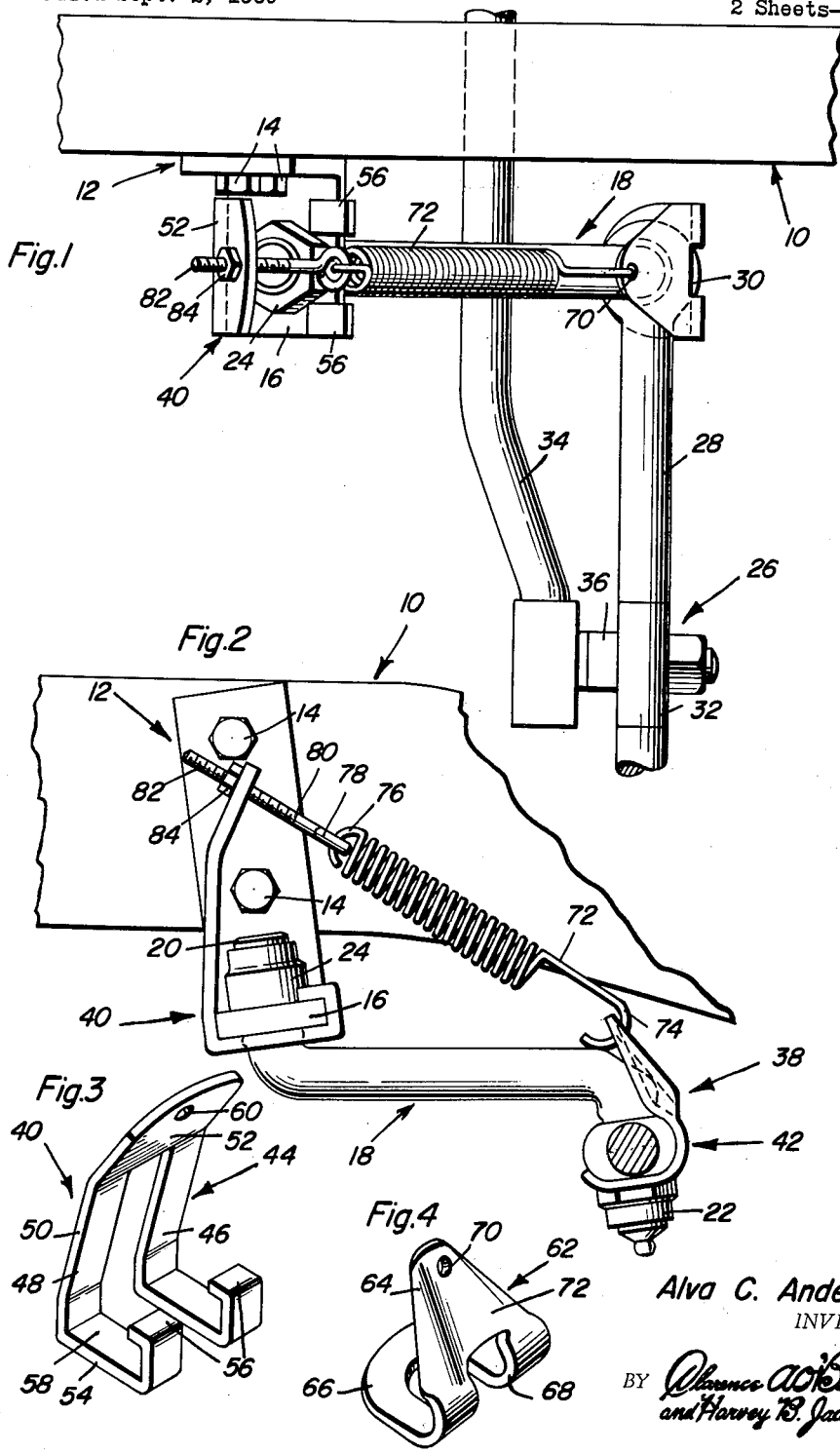

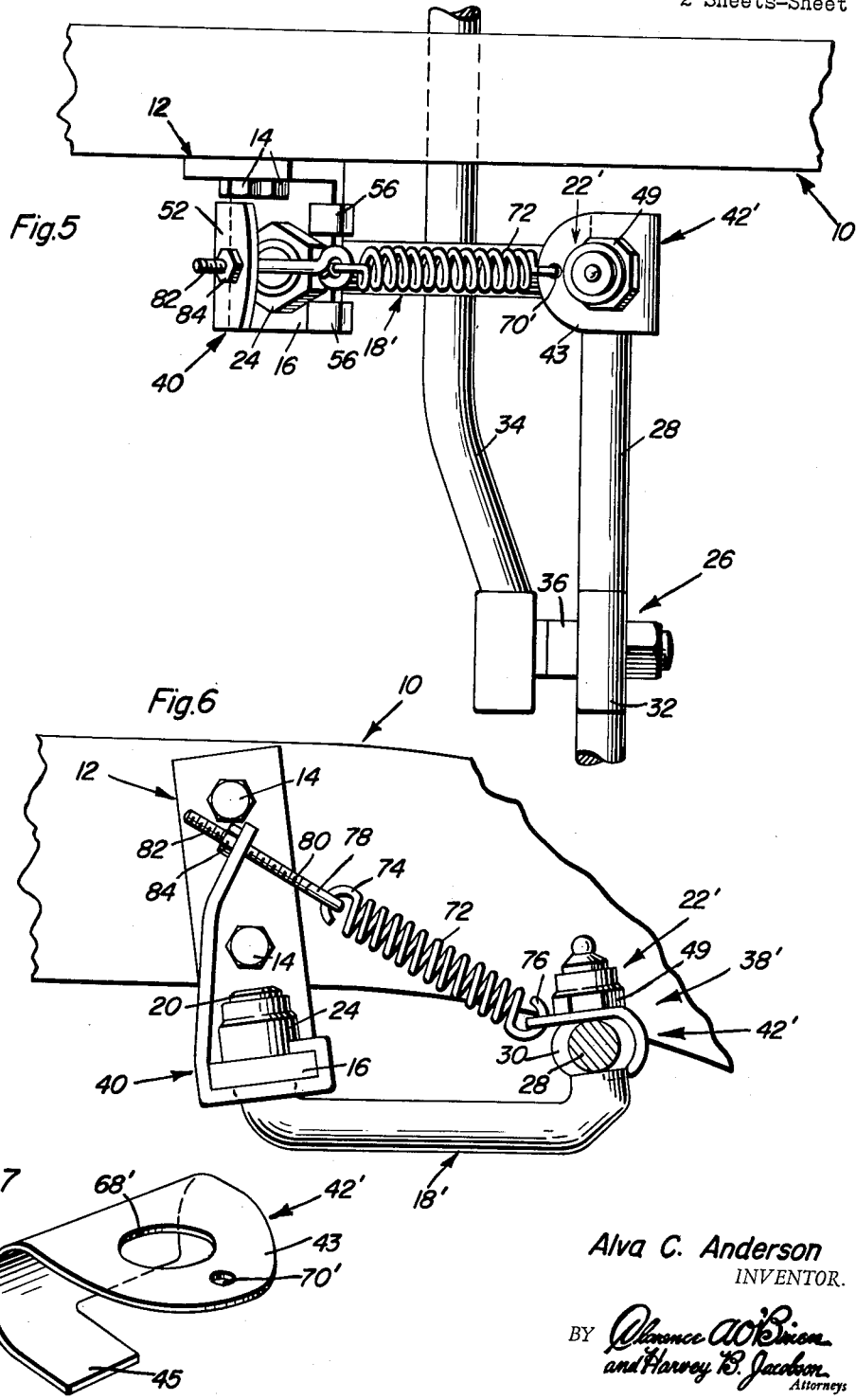

3,071,390
IDLER ARM TENSIONING DEVICE
Alva C. Anderson, Princeton, Tex., assignor of one-half to Arlis R. Clay, McKinney, Tex.
Filed Sept. 2, 1960, Ser. No. 53,645
4 Claims. (Cl. 280—95)

This invention relates to a novel and useful idler arm tensioning device, and more specifically to an idler arm tensioning device adapted for use in compensating for worn idler arm spindle portions which can frequently result in dangerous shimmying and vibration in the steering mechanism of a vehicle.

Although numerous attempts have been made heretofore to provide an idler arm tensioning device which would effectively compensate for wear of idler arm spindle portions, most of these prior devices have been ineffective either because they were adapted to compensate for wear on only one end of the idler arm or because their use of spring means inherently placed a certain amount of tension on the steering mechanism of the vehicle to which they were secured and urged the steering mechanism to a position with the steerable wheels directed in other than a straight forward positioning thereby requiring the driver of the vehicle to constantaly apply torque to the steering wheel in order to offset the tension of the idler arm tensioning device.

The main object of this invention is to provide an idler arm tensioning device which will automatically compensate for wear occurring between both spindles of the idler arm and the journal portions of the steering assembly with which they are pivotally secured.

A still further object of this invention, in accordance with the immediately preceding object, is to provide an idler arm tensioning device which will not require alterations of the steering linkage to which it is secured and which will not apply tension to that steering linkage, whereby corrective torque applied to the steering wheel in order to maintain the steerable wheels in a straight forward position will not be required.

A final object of this invention to be specifically enumerated herein is to provide a device that will conform to conventional forms of manufacture, be of simple construction and easy to install as well as readily adaptable to substantially all types of conventional steering linkages so as to provide a device that will be economically feasible, long lasting and desirable by substantially every vehicle owner whose steering assembly has incurred wear in its idler arm spindles.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a portion of a conventional form of steering linkage shown with the idler arm tensioning device of the instant invention mounted thereon;

FIGURE 2 is a side elevational view of the assembly illustrated in FIGURE 1 and seen from the bottom thereof, parts of the tie rod being broken away and shown in section;

FIGURE 3 is a perspective view of the first bracket clamp means of the idler arm tensioning device adapted for securement to the stationarily mounted bracket to which one end of the idler arm is pivotally secured;

FIGURE 4 is a perspective view of the second bracket clamp adapted for engagement with the journal portion of the tie rod in which the other end of the idler arm is rotatably journalled;

FIGURE 5 is a top plane view similar to FIGURE 1 but illustrating a modified form of the invention for use with a modified form of idler arm;

FIGURE 6 is a side elevational view similar to FIGURE 2 but illustrating the modified form of the invention and idler; and FIGURE 7 is a perspective view of the second bracket of the modified form of the invention.

Referring now more specifically to the drawings, the numeral 10 generally indicates a portion of a vehicle frame to which a mounting bracket generally referred to by the reference numeral 12 may be secured in any manner such as by fasteners 14. The bracket 12 includes an outwardly projecting flange 16 having a bore (not shown) formed therethrough.

An idler arm generally designated by the reference numeral 18 is provided with two laterally directed end portions 20 and 22 which each comprise a spindle portion. The spindle portion 20 is rotatably journalled in the bore formed in the flange 16 and secured therethrough by means of a suitable nut assembly 24. A steering linkage assembly is generally designated by the reference numeral 26 and is of conventional design including a tie rod 28 having a journal portion 30 on one end and a journal portion 32 intermediate its ends to which one end of a drag link 34 is pivotally secured by means of a spindle assembly 36. It is to be understood that the end of the drag link 34 remote from the spindle assembly 36 is connected to one steerable wheel assembly of the vehicle of which the frame 10 comprises a part and that the end of the tie rod 28 remote from the journal portion 30 is operatively connected to another steerable wheel assembly of the vehicle.

The foregoing is a description of a portion of a conventional type of steering assembly utilized in vehicles and it is to be understood that the present invention does not include any of the foregoing although it is specifically adapted to be used in connection therewith or any other similar type of steering assembly utilizing the type of idler arm referred to hereinbefore.

The idler arm tensioning device is generally designated by the reference numeral 38 and includes a first bracket clamp means generally designated by the reference numeral 40 and a second bracket clamp means generally designated by the reference numeral 42.

The first bracket clamp means 40 comprises a generally L-shaped bifurcated bracket generally designated by the reference numeral 44 whose furcations 46 and 48 are joined together at the free end of one of the legs 50 of the bracket 44 by means of a bight portion 52. The free ends of the other leg 54 of the bracket 44 are provided with turned back portions 56 which define a channel 58 between the back turned portions 56 and the leg 50 for receiving the flange 16. With attention now directed more particularly to FIGURE 2 of the drawings it will be noted that the flange 16 is received in the channel 58 with the back turned portions 56 of the bifurcations 46 and 48 overlying the upper surfaces of the flange 16 on opposite sides of the nut assembly 24. The leg 50 of the bracket 44 extends upwardly along the spindle 20 and the free end of the leg 50 converges toward and intersects with the axis of rotation of the spindle 20 a spaced distance from the free end thereof. The bight portion 52 is provided with an aperture 60 for a purpose hereinafter to be more fully set forth.

The second bracket clamp means 42 comprises a generally L-shaped bracket generally referred to by the reference numeral 62 including a first leg 64 and a second leg 66. A continuous opening 68 is formed in the adjacent end portions of the legs 64 and 66. The opening 68 is adapted to receive the spindle 22 with the leg 66 underlying the undersurfaces of the journal portion 30. The leg 64 extends upwardly and embraces one side of the journal portion 30 and is inclined toward the the other end of the idler arm 18. The free end of the leg 64 is provided with an opening 70. It is also to be noted that the leg 64 is convexed slightly outwardly as at 72 to conform to the rounded end portion of the idler arm 18 adjacent its spindle portion 22 and that the leg 66 is shaped to conform to the undersurfaces of the journal portion 30 adjacent the spindle 22 extending therethrough.

One end of an elongated tension member comprising an expansion spring 72 is hooked as at 74 and engaged with the bore 70. The other end of the spring 72 is hooked as at 76 and is engaged with the eye head 78 formed on a fastener 80 having a threaded shank portion 82 secured through the bore 60.

By securing the tension member 72 between the free ends of the legs 50 and 64, the spindles 20 and 22 are slightly cocked in their respective journals thereby compensating for wear between the spindles 20 and 22 and their respective journals.

It is to be noted that inasmuch as the bores 60 and 70 are aligned with the axis of rotation of the adjacent spindles 20 and 22 of the idler arm 18, that the pull of the spring 72 will not be offset from the longitudinal axis of either of the spindle portions 20 and 22 thereby assuring that the steering linkage 26 will not be resiliently urged to any one position by means of the idler arm tensioning device 38.

Further, in order to insure that the longitudinal center line of the expansion spring 72 will always intersect with the axis of rotation of the spindle portion 20, the opening 60 in the L-shaped bracket 62 may be formed considerably larger than the threaded shank portions 82 of the fastener 80 so that the shank portion 82 may be inclined in the opening 60 so as to enable the longitudinal axis of the fastener 80 to coincide with the longitudinal axis of the expansion spring 72. In this manner, it will be insured that the steering linkage will not be resiliently urged to any one position by the expansion spring 72.

With reference now to FIGURES 5 through 7 of the drawings, there will be seen a modified form of idler arm tensioning device generally referred to by the reference numeral 38'. The idler arm tensioning device 38' is substantially the same as the idler arm tensioning device 38 with the exception of the second bracket clamp means which is generally referred to by the reference numeral 42' and the idler arm with which the second bracket clamp means 42' is adapted to be used.

This modified form of idler arm is generally U-shaped in configuration and is generally designated by the reference numeral 18'. The idler arm 18' is substantially the same as the idler arm 18 with the exception of the free end spindle portion which is generally designated by the reference numeral 22' and the corresponding portions of the embodiment illustrated in FIGURES 5 through 7 have been designated numerals identical to those in the embodiment illustrated in FIGURES 1 through 4 of the drawings.

The second bracket clamp means 42' is generally U-shaped in cross-section and is provided with an opening 68' in the leg 43 for receiving therethrough the spindle portion 22. The leg 43 is provided with a second opening 70' for engagement by the hooked end 76 of the expansion spring 72 and the bight portion 47 of the second bracket clamp means 42' embraces the journal portion 30 with the leg 45 positioned beneath the free end portion of the journal portion 30. In this manner, the second bracket clamp means 42' is fixedly secured to the pivotal connection between the tie rod 28 and the idler arm 18' by means of the nut assembly 49 of the spindle end portion 22'.

It will therefore be noted that the idler arm tensioning device 38' operates in connection with the idler arm 18' in substantially the same manner as the idler arm tensioning device 38 operates in connection with the idler arm 18, the second bracket clamp means 42' merely acting as a substitution for the second bracket clamp means 42 when the idler arm tensioning device is to be used in connection with a generally U-shaped idler arm such as that illustrated at 18'.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a steering linkage assembly of the type including an elongated idler arm, a stationarily mounted support including an outwardly projecting flange having a bore formed therethrough, said idler arm including a first laterally extending spindle portion on one end secured to and rotatably journalled in said bore, a tie rod, said tie rod including a journal portion, a second laterally extending spindle portion parallel to said first spindle portion secured through and rotatably journalled in said journal portion; an idler arm tensioning device including first and second bracket clamp means, said first bracket clamp means clampingly engaging said flange, said second bracket clamp means clampingly engaged with said journal portion, an elongated resilient tension member, and means securing the opposite ends of said tension member to said first and second bracket clamp means with said tension member and said arm disposed in the same plane and with the longitudinal axis of said tension member disposed at an angle to the longitudinal axis of said arm in said plane, said tension member comprising an elongated expansion spring, and said first bracket clamp means including means attaching the corresponding end of said spring thereto in substantial alignment with the axis of rotation of said first spindle portion.

2. The combination of claim 1 including means for adjusting the tension of said tension member.

3. In combination with a steering linkage assembly of the type including an elongated idler arm, a stationarily mounted support including an outwardly projecting flange having a bore formed therethrough, said idler arm including a first laterally extending spindle portion on one end secured to and rotatably journaled in said bore, a tie rod, said tie rod including a journal portion, a second laterally extending spindle portion parallel to said first spindle portion secured through and rotatably journaled in said journal portion, an idler arm tensioning device including first and second bracket clamp means, said first bracket clamp means clampingly engaging said flange, said second bracket clamp clampingly engaged with said journal portion, an elongated resilient tension member, and means securing the opposite ends of said tension member to said first and second bracket clamp means with said tension member and said arm disposed in the same plane and with the longitudinal axis of said tension member disposed at an angle to the longitudinal axis of said arm in said plane, said first bracket means including a generally L-shaped bifurcated bracket whose furcations are joined together at the free end of one of its legs by means of a bight portion, the spaced free ends of the other legs of said first bracket including back turned portions defining a channel between said back turned portions and said other leg in which said flange is received, the free ends of said back turned portions overlying a portion of one side of said flange and partially embracing the portion of said first spindle secured through said flange with the furcations of said second leg extending across and underlying the other side of said flange, said first leg extending along said first spindle with its free end inclined toward and intersecting the axis of rotation of said first spindle in spaced relation to the free end of said first spindle, and means on the free end of said second leg for engagement by one end of said tension member aligned with the axis of rotation of said first spindle.

4. In combination with a steering linkage assembly of the type including an elongated idler arm, a stationarily mounted support including an outwardly projecting flange having a bore formed therethrough, said idler arm including a first laterally extending spindle portion on one end secured to and rotatably journaled in said bore, a tie rod, said tie rod including a journal portion, a second laterally extending spindle portion parallel to said first spindle portion secured through and rotatably journaled in said journal portion, an idler arm tensioning device including first and second bracket clamp means, said first bracket clamp means clampingly engaging said flange, said second bracket clamp clampingly engaged with said journal portion, an elongated resilient tension member, and means securing the opposite ends of said tension member to said first and second bracket clamp means with said tension member and said arm disposed in the same plane and with the longitudinal axis of said tension member disposed at an angle to the longitudinal axis of said arm in said plane, said second bracket clamp means including a generally L-shaped bracket, an opening formed through one leg of said second bracket receiving the end of said second spindle secured through said journal portion with said one leg in surface to surface contacting relation with the adjacent surfaces of said journal portion, the other leg of said bracket extending along, converging toward and intersecting, at its free end, the axis of rotation of said second spindle, and means aligned with the axis of rotation of said second spindle on the free end of said other leg engaged by one end of said tension member.

References Cited in the file of this patent

UNITED STATES PATENTS

| | | |
|---|---|---|
| 1,290,634 | Mock | Jan. 7, 1919 |
| 1,380,724 | Lindsay | June 7, 1921 |
| 2,627,404 | Beason | Feb. 3, 1953 |
| 2,844,382 | Dick | July 22, 1958 |
| 2,932,529 | Gerner | Apr. 12, 1960 |